United States Patent
Werner et al.

(10) Patent No.: US 10,956,004 B2
(45) Date of Patent: Mar. 23, 2021

(54) RECOGNIZING USER INTERFACE ELEMENT SELECTION

(71) Applicant: International Business Machines Corporation, Armonk, NY (US)

(72) Inventors: John S. Werner, Fishkill, NY (US); Andrew Gerald Crimmins, Montrose, NY (US); Arkadiy O. Tsfasman, Wappingers Falls, NY (US); Pasquale A. Catalano, Wallkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/189,385

(22) Filed: Nov. 13, 2018

(65) Prior Publication Data

US 2020/0150851 A1    May 14, 2020

(51) Int. Cl.
| | |
|---|---|
| *G06F 3/048* | (2013.01) |
| *G06F 3/0484* | (2013.01) |
| *G06F 3/0488* | (2013.01) |
| *G06F 3/044* | (2006.01) |

(52) U.S. Cl.
CPC ...... *G06F 3/04842* (2013.01); *G06F 3/04886* (2013.01); *G06F 3/044* (2013.01)

(58) Field of Classification Search
CPC .. G06F 3/04842; G06F 3/04886; G06F 3/044; G06F 3/0416; G06F 3/041
See application file for complete search history.

(56) References Cited

U.S. PATENT DOCUMENTS

| | | | |
|---|---|---|---|
| 7,512,893 B2 | 3/2009 | Gale et al. | |
| 7,653,883 B2 | 1/2010 | Hotelling et al. | |
| 8,040,142 B1* | 10/2011 | Bokma | G06F 3/044 |
| | | | 324/658 |
| 9,182,889 B1 | 11/2015 | Karlo et al. | |
| 9,513,801 B2 | 12/2016 | Chaudhri | |
| 9,600,298 B2 | 3/2017 | Geva et al. | |
| 9,910,524 B1* | 3/2018 | Wells | G06F 1/1684 |
| 9,959,025 B2 | 5/2018 | Bernstein et al. | |
| 2003/0132922 A1 | 7/2003 | Philipp | |
| 2006/0224994 A1 | 10/2006 | Cheemalapati et al. | |
| 2007/0192734 A1 | 8/2007 | Berstis et al. | |
| 2008/0034304 A1 | 2/2008 | Feuerbacher et al. | |
| 2009/0193357 A1 | 7/2009 | Panico et al. | |
| 2011/0113381 A1* | 5/2011 | Schwartz | G06F 3/04842 |
| | | | 715/845 |

(Continued)

*Primary Examiner* — Mahelet Shiberou
(74) *Attorney, Agent, or Firm* — Cantor Colburn LLP; Teddi Maranzano (57) ABSTRACT

According to one or more embodiments of the present invention, a computer-implemented method includes detecting an initiation of a user interaction and in response, determining one or more user interface elements displayed on a display, a first user interface element being at a first position on the display. The method further includes, based on determining a completion of the user interaction at the first position on the display, selecting the first user interface element based on a determination that a second user interface element is rendered at the first position, the second user interface element being rendered at the first position between the initiation and the completion of the user interaction.

12 Claims, 5 Drawing Sheets

(56) References Cited

U.S. PATENT DOCUMENTS

| | | | |
|---|---|---|---|
| 2013/0147732 A1* | 6/2013 | Peterson | G06F 3/044 345/173 |
| 2014/0362035 A1* | 12/2014 | Mo | G06F 3/044 345/174 |
| 2017/0255293 A1* | 9/2017 | Sundara-Rajan | G06F 3/0414 |
| 2017/0329495 A1 | 11/2017 | Feiereisen et al. | |

* cited by examiner

RECOGNIZING USER INTERFACE ELEMENT SELECTION

BACKGROUND

The present invention relates to computing technology, and particularly to avoiding bad input during user interface changes particularly in devices that use touchscreens.

Many computing devices, such as tablet computers and smartphones, have displays that incorporate dynamic user interfaces for both content and touch display interaction. For example, some computing devices may utilize a portion of a display for touch display user-interfacing, such as an on-screen virtual keyboard. Another portion of the display may be used for content display, such as for display of a text message being typed into the computing device or for the display of an image or video.

SUMMARY

According to one or more embodiments of the present invention, a computer-implemented method includes detecting an initiation of a user interaction and in response, determining one or more user interface elements displayed on a display, a first user interface element being at a first position on the display. The method further includes, based on determining a completion of the user interaction at the first position on the display, selecting the first user interface element based on a determination that a second user interface element is rendered at the first position, the second user interface element being rendered at the first position between the initiation and the completion of the user interaction.

According to one or more embodiments of the present invention, a computer program product has a computer readable storage medium having stored thereon program instructions executable by one or more processing devices to perform a method that includes detecting an initiation of a user interaction and in response, determining one or more user interface elements displayed on a display, a first user interface element being at a first position on the display. The method further includes, based on determining a completion of the user interaction at the first position on the display, selecting the first user interface element based on a determination that a second user interface element is rendered at the first position, the second user interface element being rendered at the first position between the initiation and the completion of the user interaction.

According to one or more embodiments of the present invention, a system includes a display, a memory, and a processor coupled with the display and the memory. The processor implements a method that includes detecting an initiation of a user interaction and in response, determining one or more user interface elements displayed on a display, a first user interface element being at a first position on the display. The method further includes, based on determining a completion of the user interaction at the first position on the display, selecting the first user interface element based on a determination that a second user interface element is rendered at the first position, the second user interface element being rendered at the first position between the initiation and the completion of the user interaction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Computing devices today, typically, use touchscreen devices as displays. Displays on some computing devices have very limited area for displaying content and elements with which users can interact with for user input to the device. Accordingly, user interactive elements can overlay each other in one or more examples. Such user interactive elements can include notifications, popups, and various other user interface elements that can dynamically appear and disappear from the touchscreen. As a result, a user may interact with such elements inaccurately and therefore make errors in entering input to the device. As a result, there is a need for providing improved techniques for recognizing the user interface element that a user desires to interact with on the touchscreen.

When using a computing device, such as a mobile device, with a touchscreen, there are multiple instances where a user accidentally clicks (selects) a wrong widget, which can be a selectable icon, button, link, or any other such user interface element. For example, a user may attempt to click a widget towards the top of the screen (e.g., a back button) and just before the user's finger makes contact with the desired widget, a notification pops up and the user ends up clicking the notification and is taken to another application, webpage, or the like, that the user does not desire to interact with. In another example, a user may attempt to click a link as a user interface, such as a webpage, is loading and accidentally clicks the wrong link as objects render causing a shift in the position of the desired link. Accordingly, a technical challenge exists for recognizing a user interface element that the user desires to interact with, particularly in the case of touchscreen-enabled computing devices.

One or more embodiments of the present invention address such technical challenges and facilitate the desired widget/link on a touchscreen mobile device to be determined such that the user is not taken to an undesired application, webpage, and the like.

Figure 1:
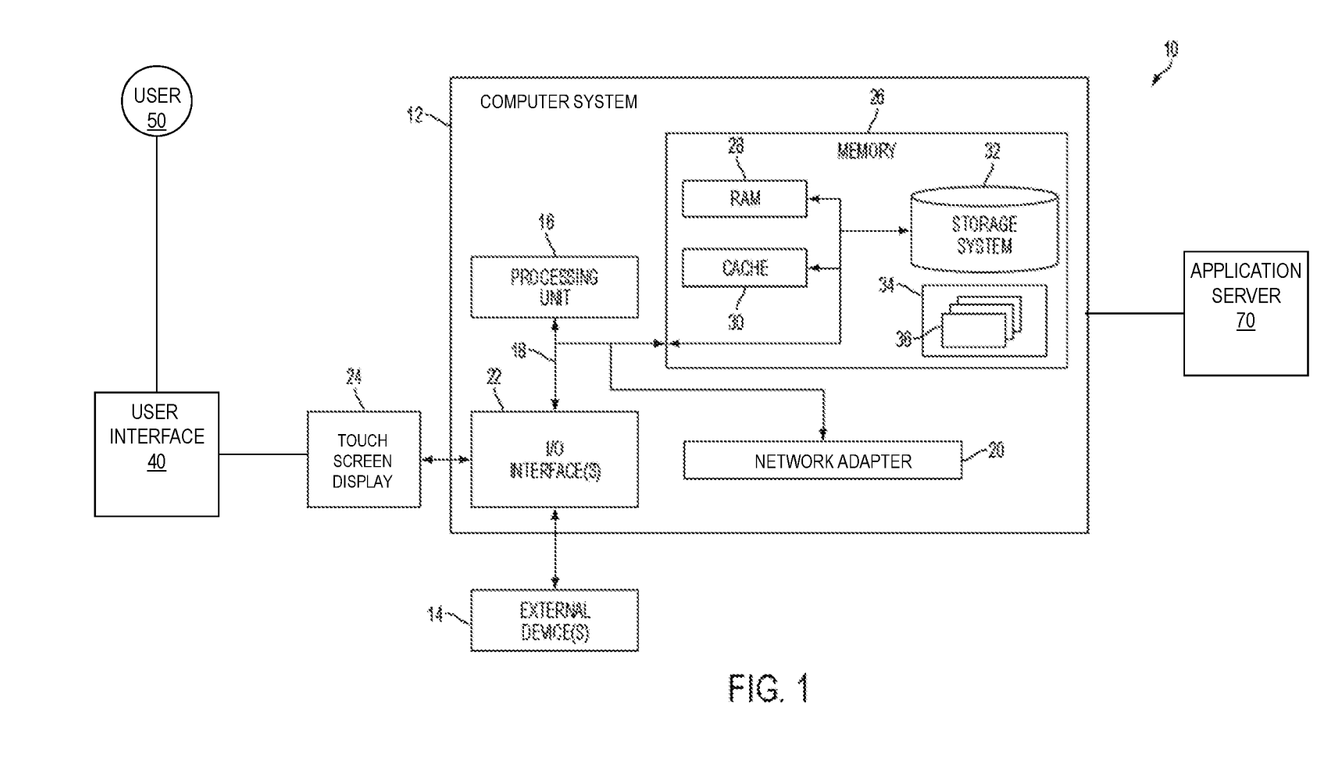
FIG. 1 depicts a schematic of an example of a system according to one or more embodiments of the present invention.

FIG. 1 depicts a schematic of an example of a system 10 according to one or more embodiments of the present invention. The depicted system 10 is only one example of a suitable computing system and is not intended to suggest any limitation as to the scope of use or functionality of embodiments of the invention described herein.

The system 10 includes a computer system 12 that facilitates executing one or more computer program applications. A user 50 interacts with the computer program applications via a user interface 40 via a touchscreen display 24. The user interface 40 can update in a synchronous or asynchronous manner. For example, the computer system 12 can be executing a web browsing system with the user interface 40 depicting a webpage, the layout of the webpage updating periodically. Alternatively, or in addition, the system 10 can be executing a computer application, such as an email application, a messaging application, a game, or any other such application.

The computer system 12 can be operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile devices, smartphone, personal digital assistant, media player, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in system 10 is shown in the form of a general-purpose computing device. The components of computer system 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 26 can include computer system readable media in the form of volatile memory, such as random access memory (RAM) 28 and/or cache memory 30. Computer system 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, web browser, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system 12 may also communicate with one or more external devices 14 such as a keyboard, a pointing device, a touchscreen display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

The computer system 12 can facilitate the user 50 to access the user interface 40 of a computer application. The computer application can execute locally on the computer system 12, or the computer application has a backend operation on an application server 70. The user interface 40 has a layout that includes positions and sizes of one or more user interface elements. The user interface elements can include buttons, links, and the like. In one or more examples, the user interface elements can further include notifications generated on the computer system 12, such as interactive notification icons at a predetermined location on the touchscreen display 24, such as the top of the screen, side of the screen, and the like.

In one or more examples, the application server 70 can update the layout of the user interface 40 periodically. In one or more examples, the application can be a web browser and the user interface 40 can be a webpage that the user 50 is browsing from a webserver that is on the application server 70. The user interface 40 can be a webpage or an application that provides content from a news server, a social media network, a search engine, a media streaming server, an e-commerce server, or any other such online content that the user 50 can access on the Internet.

One or more elements on the user interface 40 can change dynamically in response to various trigger events. For example, periodically advertisements on the user interface 40 reload. Alternatively, or in addition, when video and/or music players play content, an advertisement can be inserted in the middle of the playback. Also, in one or more examples, such media players automatically load additional content to playlists that a user has selected for playback. Alternatively, or in addition, in case the user interface 40 is displaying news, a live report of an event (such as a sports event, a news conference, etc.) or other continuously changing information, the content is refreshed at a predetermined frequency or in response to an event. All of such changes to content or several other types of dynamic changes to the user interface 40 cause an application program 34 that is rendering the user interface 40 to change the layout of the user interface 40, and the changes may appear random to the user 50. In yet other examples, resizing the window of the application program 34 can cause the layout of the user interface 40 to be modified. Further yet, while the user 50 is using the computer program 34, a notification from another computer program that is being executed by the computer system 12 can cause a user interface element to be displayed on the display 24. The notification can be displayed at a predetermined position on the display 24.

When the layout of the user interface 40 changes, the user 50 may accidentally select the wrong user interface element, for example via a tap (in the case of a touchscreen) on the wrong element. This can be even more frustrating in case the computer system 12 is a mobile device with a relatively smaller screen, in comparison to a desktop computer, for example. Such cases of input to a wrong element can be frustrating in other cases such as in the case of a weak network connectivity. In such a case, when the wrong input is accepted by the application program 34, such as a web browser, it loads another unwanted webpage. The user 50 typically has to use the back button to reload the original user interface 40, and try again to select the content that he/she wants. This can be time-consuming. Further, this can cause extra costs to the user 50, such as, data charges.

One or more embodiments of the present invention address such technical challenges of wrong input being provided to a user interface 40 via the application program 34 because of layout changes in the user interface 40. Accordingly, embodiments of the present invention are rooted in computer technology, such as computing devices with user interfaces provided via touchscreen, and provide improvements to such computing devices. For example, embodiments of the present invention save the user time and amount of data communicated via the computer networks. Other improvements to computer technology that are provided by embodiments of the present invention can be identified by a person skilled in the art.

Figure 2:
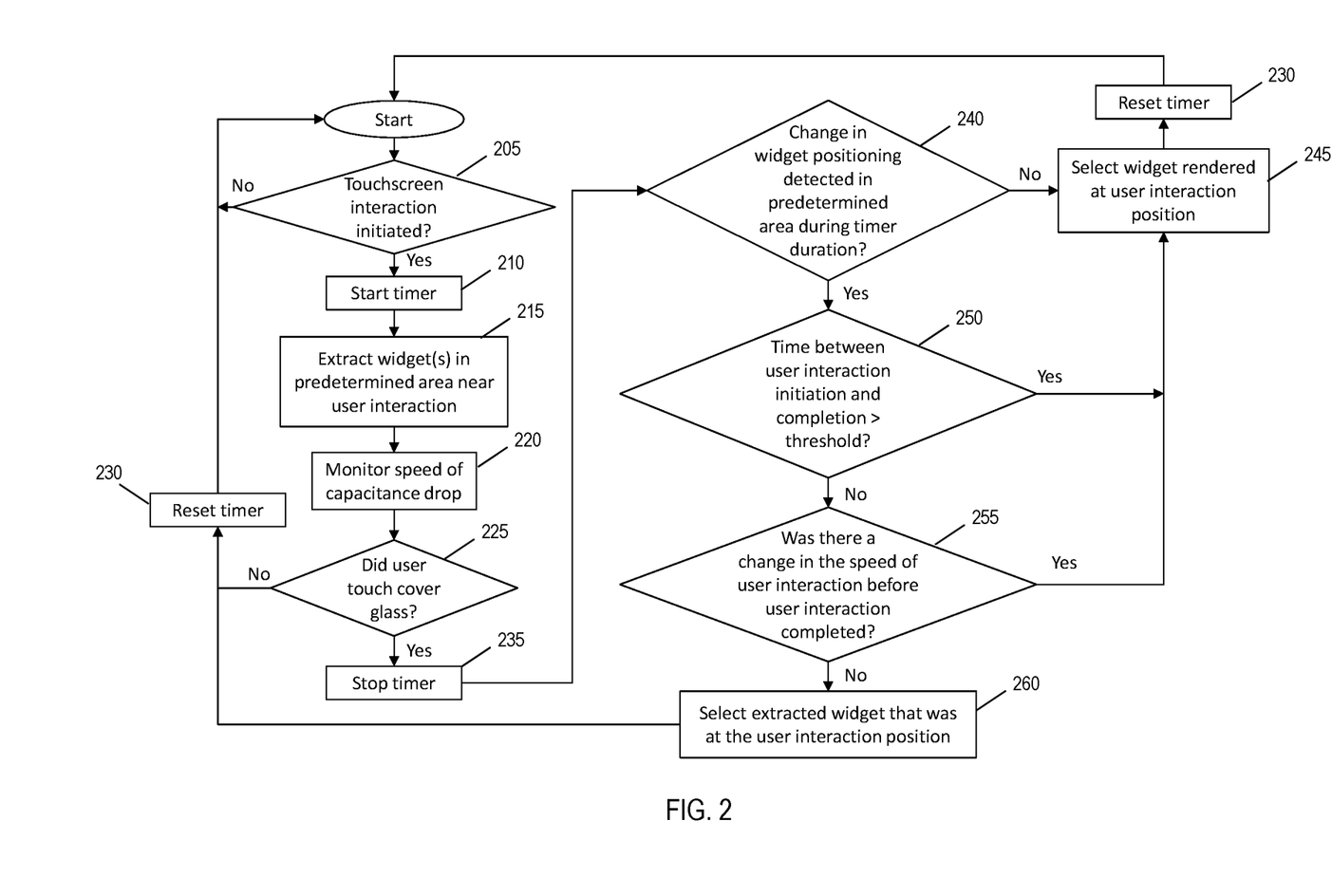
FIG. 2 illustrates a flowchart of an example method for determining a user interface element that a user desired to interact with according to one or more embodiments of the present invention.

FIG. 2 illustrates a flowchart of an example method for determining a user interface element that a user desired to interact with according to one or more embodiments of the present invention. The method includes determining if a touchscreen interaction is initiated by the user 50 (205). In one or more examples, the initiation is detected by monitoring a change in capacitance of the touchscreen display 24.

Figure 3:
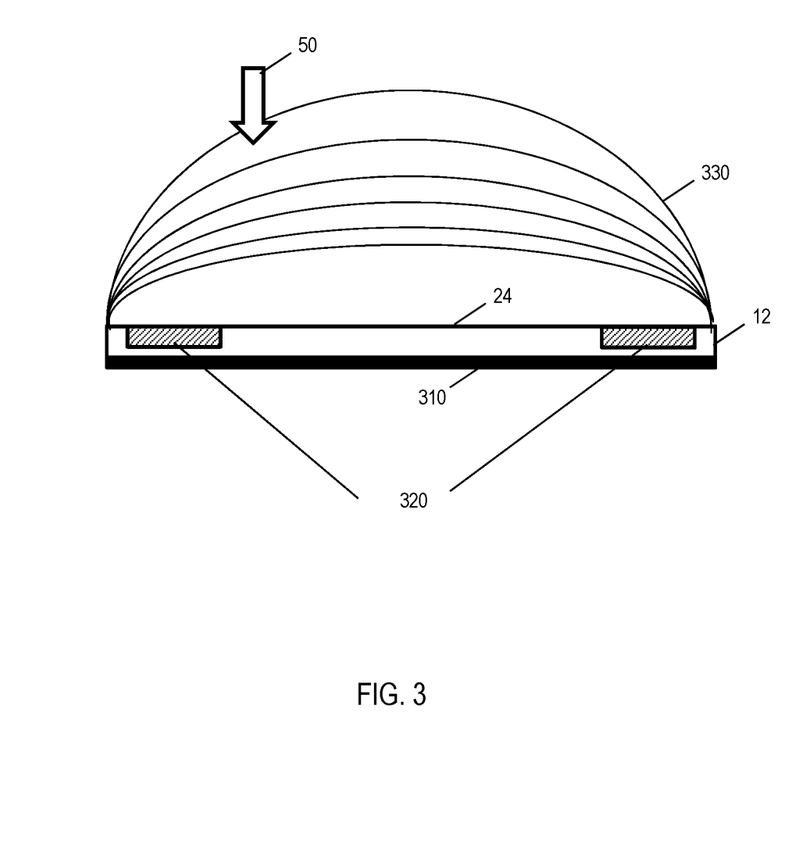
FIG. 3 depicts an operation of an example capacitive touchscreen display according to one or more embodiments of the present invention.

FIG. 3 depicts an operation of an example capacitive touchscreen display according to one or more embodiments of the present invention. An excitation source is connected to a transmitter 310 generating an electric field 330 proximate to a receiver 320 on the touchscreen display 24 of the computing system 12. The receiver 320 measures and monitors changes in capacitance of the electric field 330. When a finger (or some other grounded object) interferes with the electric field 330, one or more of the field lines are shunted to ground and do not reach the receiver 320. Hence, the capacitance measured at the receiver 320 decreases when a grounded object, such as a finger, a stylus, etc., comes within a predetermined detection distance from the electric field 330. The detection range can vary in one or more embodiments of the present invention, for example, the detection range can be as large as 10 centimeters. The electric field strength (capacitance) that is measured at the receiver can be used to detect initiation of user interaction with the touchscreen display 24, even before the user 50 touches or taps the touchscreen display 24. In other types of touchscreen displays, the detection of initiation of user interaction, before the actual interaction (in which the user 50 touches/taps the touchscreen display 24) can be performed using other techniques than measuring the capacitance. It is understood that the positions of the one or more components depicted in FIG. 3 can vary from one embodiment to another embodiment of the present invention.

Referring to the flowchart of FIG. 2, the computer system 12 continuously monitors for the initiation of a user interaction (205). Once the user interaction initiation is detected, a timer is started (210). Further, widget(s) within a predetermined proximity of a position of the user interaction are identified (215). Here, the computer system 12 predicts a position of the user interaction to be coordinated on the touchscreen display 24 where the receiver 320 detected the capacitance drop. A predetermined area that is proximate to the predicted position is determined. For example, the predetermined area can be a circular area of about 1 centimeter squared with the predicted position as the center. Alternatively, the predetermined area can be a square, octagon, or any other shape. Further, the predetermined area can have a different dimension than the above example. Further yet, the predetermined area can have a different relation to the predicted user interaction position than the above example; for example, instead of the center, the predicted user interaction position can be used as a vertex of a square. In some embodiments, the predetermined area may be the entire display.

Further, the method includes determining user interface elements (widgets) that have screen coordinates that overlap the predetermined area. In one or more examples, the computer system 12 requests the application that is actively being executed, or actively using the touchscreen display 24, to provide the one or more user interface elements with screen coordinates that overlap the predetermined area.

The method further includes monitoring a speed of the user interaction (220). For example, the speed of capacitance drop detected by the receiver 320 is deemed as the speed of the user interaction. Further, the computer system 12 determines if the user 50 completes the user interaction (225). The user interaction is completed if the user 50 touches/taps the touchscreen display 24 within a predetermined threshold duration (e.g. 1 second, 3 seconds, etc.) since the detection of the initiation of the user interaction. If the user interaction is not completed within the threshold duration, the timer is stopped and reset (230), and the computer system 12 restarts the operation of the method.

If the user interaction does complete, the timer is stopped and the duration measured by the timer is recorded (235). Further, the computer system 12 determines if there was a change in widget positioning in the predetermined area during the time duration (240).

Figure 4:
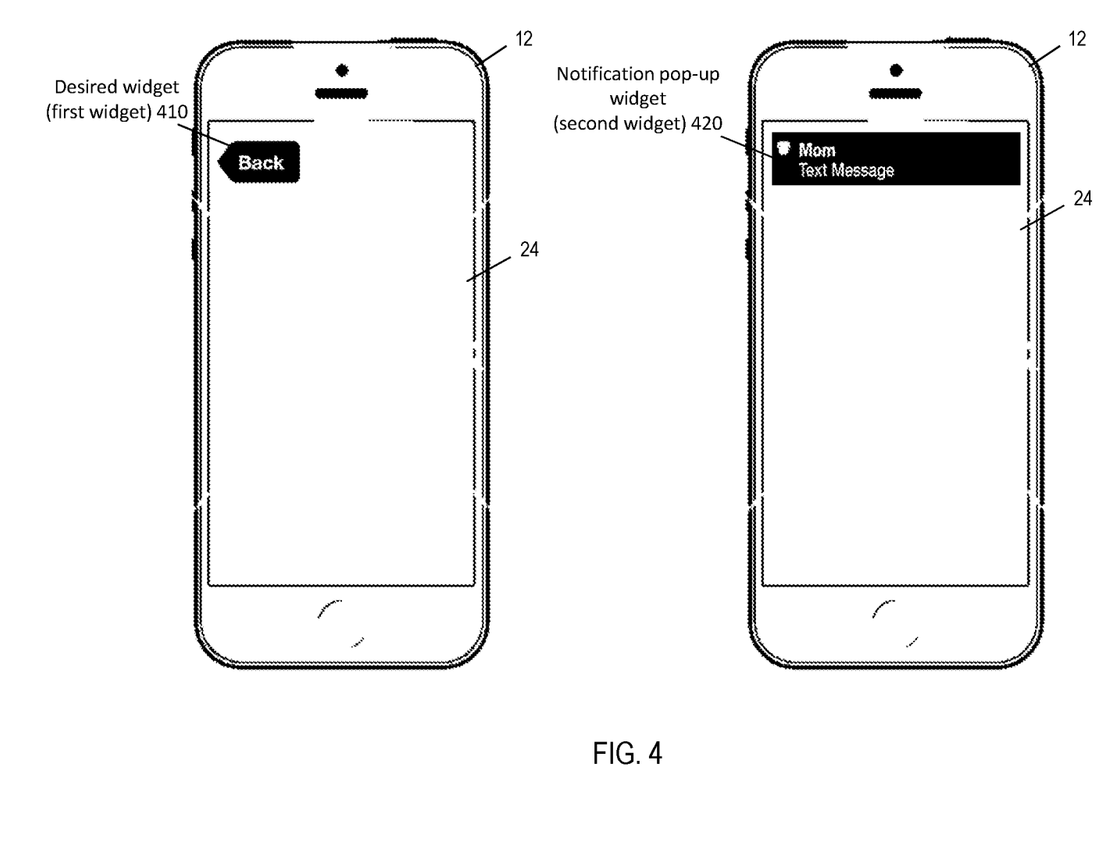
FIG. 4 depicts an example scenario for change in widget position according to one or more embodiments of the present invention.

FIG. 4 depicts an example scenario for change in widget position according to one or more embodiments of the present invention. Change in widget positioning can include a second widget 420 being displayed in a screen position that overlaps a first widget 410 that was displayed in the predetermined area. The second widget 420 can be a widget that was at a different screen position earlier, which is now moved into the position that overlaps the first widget 410; or the second widget 420 can be a widget that was not displayed on the touchscreen display 24 earlier (before the user interaction initiation started). Alternatively, or in addition, the change in widget position can include the first widget 410 that is rendered at an original position in the predetermined area being moved to a second position causing the second widget 420 being rendered at the original position. Several other examples of change in widget position are possible.

In the displayed example scenario the first widget 410 that is a back button is now covered by the second widget 420, which is notification message. The user interaction was initiated to use the first widget 410, however, because the second widget 420 is now rendered at that position within the timer duration, upon completion of the user interaction, the user 50 would interact with the second widget 420, although the desired widget was the first widget 410 in this case.

Referring to the flowchart of FIG. 2, if a change in the widget position is not detected (240), the computer system 12 initiates the user interaction with the widget that is presently rendered at the position of the user interaction (245). Because there is no change in the positioning of the widget, at least in the predetermined area, it is deemed that the user 50 is interacting with the widget that has continuously been rendered at the user interaction position since s/he initiated the user interaction. The timer is reset (230) and the method is repeated as a continuous loop.

If a change in the widget position is detected (240), the computer system 12 checks if the time duration between the user interaction initiation and completion is greater than (or equal to) a predetermined duration threshold (e.g. 0.1 seconds, 0.5 seconds, etc.) (250). This duration can be provided by the time measurement. In one or more examples, the duration threshold used is preset based on an age of the user 50 (e.g., a child may have faster reaction times than a senior citizen, so the child can have a smaller duration threshold). The duration threshold can be configurable. Alternatively, or in addition, the duration threshold can be learned over time on an individual user basis as the user 50 uses the computer system 12. The learned threshold may be average time for a button press within one application, across many applications, at certain times of the day (e.g., the user may have slower reaction times early in the morning or late at night as opposed to the middle of the afternoon), etc. The threshold time may also or alternatively be adapted to the devices current signal strength (e.g., the threshold may be twice as long for a user with a 3G connection verses a device with a strong Wi-Fi connection due to the speed at which objects render on the device).

If the user interaction did take at least the predetermined duration threshold to complete, the computer system 12 initiates the user interaction with the widget that is presently rendered at the position of the user interaction (245). Because there was a delay of at least the predetermined duration between the initiation of the user interaction and the completion of the user interaction, it is deemed that the user 50 noticed the change in the widget position and still continued with the user interaction, desirably with the second widget 420.

Alternatively, if the user interaction did not take at least the predetermined duration threshold to complete (250), the computer system 12 analyzes the speed of the user interaction to determine if the user's 50 speed of interaction was altered as s/he approached the touchscreen display 24 (255). The analysis includes determining if there was a change in the speed of the user interaction before the user interaction completed. This can be determined based on the speed/rate of capacitance drop during the timer duration. If the speed of the user interaction reduces by at least a predetermined threshold value during the timer duration, the computer system 12 deems the user interaction speed to be an actionable drop, and not otherwise.

If a change in the user interaction speed is an actionable drop, the computer system 12 initiates the user interaction with the widget that is presently rendered at the position of the user interaction (245). Because the user 50 altered his/her speed while approaching the touchscreen device 24, it is deemed that the user 50 recognized the change from the first widget 410 to the second widget 420 on the touchscreen display 24, and desirably decided to select the second widget 420.

If the change in the user interaction speed is not detected (i.e., not an actionable drop) the computer system 12 selects the extracted widget that is the first widget 410, that was at the user interaction position when the user interaction was initiated (260). In this case, because the user 50 did not alter his/her speed while approaching the touchscreen display 24, it is deemed that the user 50 did not see the second widget 420 overlapping the first widget 410 and that the user 50 was attempting to select the first widget 410. Accordingly, the first widget 410 is selected.

Accordingly, one or more embodiments of the present invention facilitate selection of the first widget 410 even though the second widget 420 is at the user interaction position touched by the user 50. The technical solutions facilitated by one or more embodiments of the present invention provide that the method may be implemented in an operating system running on the computer system 12, within a specific application, such as a web browser or the like. One or more embodiments of the present invention improve the user experience on a computer system 12, such as a touchscreen device, within an application such that the user is not taken to undesired locations because of changes in the user interface. Accordingly, one or more embodiments of the present invention provide improvements to computing technology, particularly user interfaces.

It should be noted that embodiments of the present invention can also be applied to desktop/laptop type computing devices that do not include a touchscreen display, and that the computer system 12 with the touchscreen display 24 is used in the above examples herein for explanation purposes. For example, in the case of computer systems that do not include touchscreen displays, the on-screen widget positions may be extracted as the user 50 begins moving a position of an input device such as a mouse, a joystick, a trackball, etc. If a widget under the selected user interaction position has moved, and the time between the selection and widget movement is less than a threshold time, the first widget is selected in a similar manner to the touchscreen interaction in the above examples.

Accordingly, one or more embodiments of the present invention facilitate technical solutions for avoiding bad user input during changes to a layout of a user interface. The technical solutions described herein are rooted in computer technology, particularly rendering user interfaces on touchscreen devices with which a user interacts. The technical solutions described herein facilitate an improvement to the computer technology by avoiding bad user inputs, or in other words transferring user input to an intended element on the user interface despite a layout of the user interface being in flux or in transition. Furthermore, the technical solutions described herein at least avoid the user input being used to perform an unintended operation by another user interface element of the same or a different application that has replaced a previous element to which the user intended to provide the user input. Such improvements reduce user frustration as well as reduces network data being communicated and other computing resources being used to perform one or more operations that the user did not intend in the first place.

Figure 5:
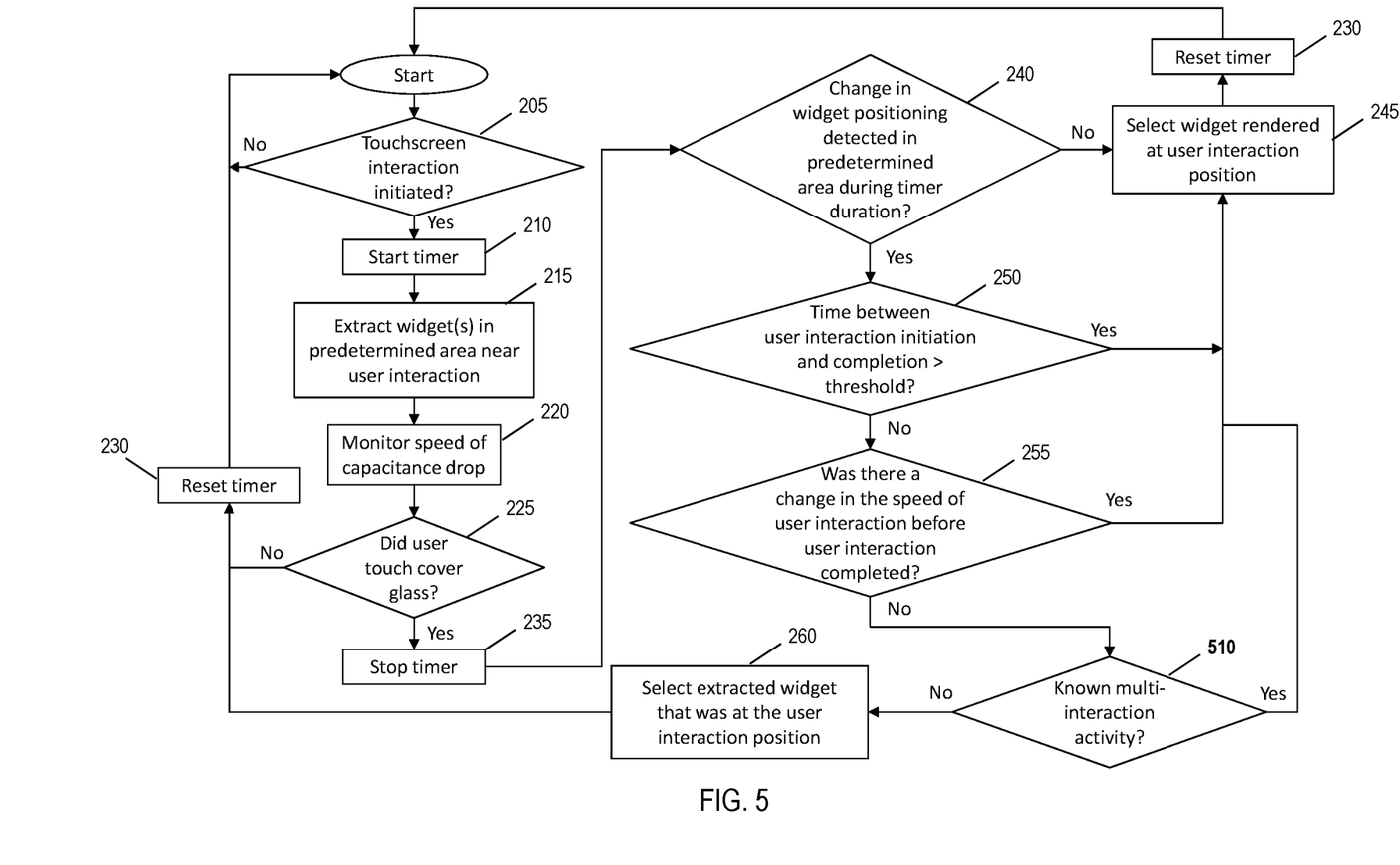
FIG. 5 illustrates a flowchart of an example method for determining a user interface element that a user desired to interact with according to one or more embodiments of the present invention.

FIG. 5 illustrates a flowchart of an example method for selecting a widget according to one or more embodiments of the present invention. The method illustrated in the flowchart of FIG. 5 performs further analysis than that described earlier. Here, if the second widget 420 overlaps the first widget 410, and if the change in the user interaction speed does not have an actionable drop (255), the computer system 12 determines if the second widget 420 is part of a known multi-interaction activity, which includes a series of user interactions (510).

The multi-interaction activity includes a sequence of user interactions that the user 50 performs to complete a task. For example, to compose an email, the user 50 clicks a button to launch the email application, followed by a widget to open a menu followed by a widget to compose the email from the shown menu. The user 50 can then proceed to compose the email. In this example, composing an email is a 3-interaction activity. The positions of the widgets that the user 50 selects to perform the 3-interaction activity are fixed such that the user, after performing it at least a predetermined number of times, anticipates where the widgets are on the touchscreen display 24 and can hover his/her finger (or stylus, etc.) over the touchscreen display 24 before said widgets appear. It is understood that above is just an example of a multi-interaction activity, and that various other multi-interaction activities are possible.

Accordingly, for such frequently performed multi-interaction activities, the computer system creates a database of learned sequences of positions on the touchscreen display 24 to which the user 50 goes to complete the series of widget selections. The database can be stored in the memory 26. The frequently performed multi-interaction activities are learned by the computer system 12 by monitoring the user's 50 interaction sequences and if a specific sequence of interactions is performed at least a predetermined number of times, such as 27, 30, etc., the sequence can be stored in the database as a known multi-interaction activity. Alternatively, or in addition, the user 50 can store a sequence of interactions as a multi-interaction activity.

Accordingly, referring to the flowchart of FIG. 5, the computer system 12 checks if the presently ongoing user interaction is part of a known multi-interaction activity (510). The computer system 12 can make this determination based on one or more most recent widget selections and checking if that sequence exists in the database of known multi-interaction activities. If the sequence exists in the database, that is a multi-interaction activity is ongoing (510), then the second widget 420 is selected even if the selection is performed in less than the threshold time, and even if there is no user interaction speed change (245). If a known multi-interaction activity is not ongoing, the first widget 410 is selected (260). In cases where muscle memory kicks in for the user for commonly used tools, the additional analysis can facilitate the user 40 to continue to perform the multi-interaction activity without waiting for the threshold duration time.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. "Java" and all Java-based trademarks and logos are trademarks or registered trademarks of Oracle and/or its affiliates.

What is claimed is:

1. A computer-implemented method comprising:
    detecting an initiation of a user interaction at a first position on a touchscreen display based on a change in capacitance of the touchscreen display, a first user interface element encompassing the first position on the display;
    determining one or more user interface elements being displayed on the display after the initiation of the user interaction, the one or more user interface elements comprising a second user interface element also encompassing the first position;
    monitoring a rate of change of the capacitance in response to the initiation of the user interaction; and
    based on determining a completion of the user interaction at the first position on the display:
        selecting the second user interface element based on a determination that the rate of change of the capacitance was altered before the completion of the user interaction; and
        selecting the first user interface element based on a determination that the rate of change of the capacitance was not altered before the completion of the user interaction.

2. The computer-implemented method of claim 1, further comprising:
    starting a timer based on the initiation of the user interaction;

stopping the timer based on the completion of the user interaction; and based on a determination that an elapsed time in the timer is greater than a threshold, selecting the second user interface element in response to the completion of the user interaction.

3. The computer-implemented method of claim 2, wherein the first user interface element is selected in response to the completion of the user interaction based on a determination that the elapsed time in the timer is not greater than the threshold.

4. The computer-implemented method of claim 1, wherein determining the one or more user interface elements displayed comprises determining a subset of user interface elements in a predetermined area within a predetermined proximity of the first position.

5. A computer program product comprising a computer readable storage medium having stored thereon program instructions executable by one or more processing devices to perform a method comprising:

detecting an initiation of a user interaction at a first position on a touchscreen display based on a change in capacitance of the touchscreen display, a first user interface element encompassing the first position on the display;

determining one or more user interface elements being displayed on the display after the initiation of the user interaction, the one or more user interface elements comprising a second user interface element also encompassing the first position;

monitoring a rate of change of the capacitance in response to the initiation of the user interaction; and based on determining a completion of the user interaction at the first position on the display:

selecting the second user interface element based on a determination that the rate of change of the capacitance was altered before the completion of the user interaction; and selecting the first user interface element based on a determination that the rate of change of the capacitance was not altered before the completion of the user interaction.

6. The computer program product of claim 5, wherein the method further comprises:

starting a timer based on the initiation of the user interaction;

stopping the timer based on the completion of the user interaction; and based on a determination that an elapsed time in the timer is greater than a threshold, selecting the second user interface element in response to the completion of the user interaction.

7. The computer program product of claim 6, wherein the first user interface element is selected in response to the completion of the user interaction based on a determination that the elapsed time in the timer is not greater than the threshold.

8. The computer program product of claim 5, wherein determining the one or more user interface elements displayed comprises determining a subset of user interface elements in a predetermined area within a predetermined proximity of the first position.

9. A system comprising:

a touchscreen display;

a memory; and a processor coupled with the touchscreen display and the memory, the processor configured to perform a method comprising:

detecting an initiation of a user interaction at a first position on the touchscreen display based on a change in capacitance of the touchscreen display, a first user interface element encompassing the first position on the display;

determining one or more user interface elements being displayed on the display after the initiation of the user interaction, the one or more user interface elements comprising a second user interface element also encompassing the first position;

monitoring a rate of change of the capacitance in response to the initiation of the user interaction; and based on determining a completion of the user interaction at the first position on the display:

selecting the second user interface element based on a determination that the rate of change of the capacitance was altered before the completion of the user interaction; and selecting the first user interface element based on a determination that the rate of change of the capacitance was not altered before the completion of the user interaction.

10. The system of claim 9, wherein the method further comprises:

starting a timer based on the initiation of the user interaction;

stopping the timer based on the completion of the user interaction; and based on a determination that an elapsed time in the timer is greater than a threshold, selecting the second user interface element in response to the completion of the user interaction.

11. The system of claim 10, wherein the first user interface element is selected in response to the completion of the user interaction based on a determination that the elapsed time in the timer is not greater than the threshold.

12. The system of claim 9, wherein determining the one or more user interface elements displayed comprises determining a subset of user interface elements in a predetermined area within a predetermined proximity of the first position.

* * * * *